US012175302B2

(12) United States Patent
Zhan et al.

(10) Patent No.: US 12,175,302 B2
(45) Date of Patent: Dec. 24, 2024

(54) TRANSITIONING OF COMPUTER-RELATED SERVICES BASED ON PERFORMANCE CRITERIA WITH FLOW EFFICIENCY VALUE

(71) Applicant: KYNDRYL, INC., New York, NY (US)

(72) Inventors: Hong Dan Zhan, Shenyang (CN); Kim Poh Wong, Singapore (SG)

(73) Assignee: Kyndryl, Inc., New York, NY (US)

( * ) Notice: Subject to any disclaimer, the term of this patent is extended or adjusted under 35 U.S.C. 154(b) by 538 days.

(21) Appl. No.: 17/105,720

(22) Filed: Nov. 27, 2020

(65) Prior Publication Data

US 2022/0171662 A1  Jun. 2, 2022

(51) Int. Cl.
*G06F 9/50* (2006.01)
*G06F 11/30* (2006.01)
(Continued)

(52) U.S. Cl.
CPC .......... *G06F 9/5083* (2013.01); *G06F 9/5038* (2013.01); *G06F 9/5072* (2013.01);
(Continued)

(58) Field of Classification Search
None
See application file for complete search history.

(56) References Cited

U.S. PATENT DOCUMENTS 6,374,369 B1 * 4/2002 O'Donnell .......... G06F 11/3466
717/130

9,026,984 B2 * 5/2015 Tung ...................... G06Q 10/06
717/101
(Continued)

FOREIGN PATENT DOCUMENTS

CN 111291994 A 6/2020

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

*Primary Examiner* — Meng Ai T An
*Assistant Examiner* — Zujia Xu
(74) *Attorney, Agent, or Firm* — CANTOR COLBURN LLP; Dan Housley

(57) ABSTRACT

A transitioning process to integrate a computer-related service with one or more other computer-related services. The computer-related service and the one or more other computer-related services are analyzed to determine whether there is a conflict in integrating the computer-related service in the computing environment. A determination is made based on the analyzing whether one or more changes are to be made to a selected component. At least the analyzing and the determining are part of an automated process generated to integrate the computer-related service, and the automated process is at least a part of the transitioning process. An indication of a performance impact of executing at least the automated process to integrate the computer-related service is obtained. The transitioning process is to continue based on the performance impact meeting one or more selected criteria and based on determining that there are not one or more changes to be made to the selected component.

20 Claims, 13 Drawing Sheets

(51) Int. Cl.
*G06F 11/34* (2006.01)
*G06N 20/00* (2019.01)

(52) U.S. Cl.
CPC ...... *G06F 11/3072* (2013.01); *G06F 11/3409* (2013.01); *G06N 20/00* (2019.01)

(56) References Cited

U.S. PATENT DOCUMENTS

| | | | |
|---|---|---|---|
| 9,300,691 B1* | 3/2016 | Banerjee | H04L 63/20 |
| 9,548,941 B2* | 1/2017 | Tompkins | H04L 41/5054 |
| 9,760,541 B2 | 9/2017 | Richman et al. | |
| 10,467,131 B1* | 11/2019 | Gupta | G06F 11/3664 |
| 10,979,312 B2* | 4/2021 | Chaganti | H04L 41/0806 |
| 2014/0278808 A1 | 9/2014 | Iyoob et al. | |
| 2015/0082292 A1* | 3/2015 | Thomas | G06F 8/65 |
| | | | 717/168 |
| 2015/0178333 A1* | 6/2015 | Webster | G06Q 30/02 |
| | | | 707/737 |
| 2016/0231999 A1 | 8/2016 | Holler et al. | |
| 2018/0018587 A1* | 1/2018 | Kobayashi | G06N 20/00 |
| 2019/0243644 A1 | 8/2019 | Jose et al. | |
| 2019/0347137 A1* | 11/2019 | Sivaraman | G06F 9/5044 |
| 2019/0362222 A1* | 11/2019 | Chen | G06F 11/3476 |
| 2021/0004311 A1* | 1/2021 | Bhide | G06F 11/3608 |
| 2021/0149666 A1* | 5/2021 | Goern | G06F 8/71 |

* cited by examiner

ACTIVITIES FROM TRADITIONAL WATERFALL TECHNIQUE

| PHASE | PREPARATION — 102 | KNOWLEDGE TRANSFER — 104 | ASSIST OPERATION — 106 | ONGOING OPERATION — 108 |
|---|---|---|---|---|
| TIMELINES — 110 | STEP 1 - 4 WEEKS BEFORE GO-LIVE | STEP 2 - 2 WEEKS BEFORE GO-LIVE | STEP 3 - AT LEAST KEEP 2 WEEKS | STEP 4 - COMPLETE TRANSITION |
| CONTENTS — 112 | 1. INPUT CHECKLIST<br><br>2. PROJECT TEAM INFORMS RESPONSIBLE TEAMS BY MAIL WITH CHECKLIST<br><br>3. PREPARE TRAINING MATERIAL, DEFINE SCOPE, KNOWLEDGE TRANSFER PLAN, QUESTIONS & ANSWERS BY PROJECT TEAM<br><br>4. REVIEW CHECKLIST AND SCHEDULE TRAINING SESSION BY PROJECT MANAGER AND TECHNICAL LEADERS<br><br>5. ARRANGE RESOURCES FOR GO-LIVE, TO BE SUPPORTED BY TEAM LEADERS | 1. HOLD THE TRAINING IDENTIFIED<br><br>2. QUESTIONS & ANSWERS | 1. MONITOR TICKET TREND AND PREPARE FURTHER KNOWLEDGE TRANSFER<br><br>2. SIGN TRANSITION COMPLETION REPORT AND EXIT | 1. KEEP REVIEWING AND OPTIMIZE DURING DAILY WORK |

ACTIVITIES FROM AGILE TECHNIQUE

| PHASE | PROJECT SET UP 202 | SPRINT-1 204 | SPRINT-2 TO SPRINT-X 206 | OPERATION 208 |
|---|---|---|---|---|
| TIMELINES 210 | STEP 1 - THE DATE PROJECT SET UP | STEP 2 - 1 WEEK BEFORE RELEASE | STEP 3 - 2 WEEKS BEFORE RELEASE | STEP 4 - COMPLETE TRANSITION |
| CONTENTS 212 | 1. PROJECT TEAM INFORMS RESPONSIBLE TEAM LEADERS<br><br>2. PROVIDE PROJECT RELEASE PLAN | 1. CHECKLIST INPUT<br><br>2. CONDUCT TRAINING AND PROVIDE TRAINING MATERIALS TO TEAM LEADERS | 1. FIX PROBLEMS AND CONDUCT TRAINING<br><br>2. UAT TO BE LED BY TEAM LEADERS<br><br>3. CHECKLIST INPUT<br><br>4. CONTINUE TRAINING | 1. KEEP TRANSITION AND REGULAR REVIEW IF ANY ROUTINE TASK CAN BE HANDLED BY OTHER SERVICES<br><br>2. LONG TERM AND CONTINUE KNOWLEDGE TRANSFORMATION OF THE ENVIRONMENT TO BE DERIVED AFTER OPERATING IT FOR SEVERAL MONTHS |

|  | REGISTER ~300 | REGISTER REVIEW ~302 | CONTENT COMPLEMENT ~310 | KNOWLEDGE TRANSFER ~320 |
|---|---|---|---|---|
|  | KICK-OFF ~304 |  | ONE WEEK AHEAD ~312 | TWO WEEKS AHEAD ~322 |
| TRADITIONAL WATERFALL TECHNIQUE | IT PRODUCTION TEAM TO REGISTER ONLINE WHEN SERVICES KICK-OFF IF IT SUPPORT NEEDED. BASIC PROJECT INFORMATION IS TO BE PROVIDED IN THIS PHASE ~350, ~352 | IT SUPPORT SERVICES OWNER WILL REVIEW AND APPROVE THE SERVICES TRANSFER PROCESS-START. ARRANGES TEAM LEADERS TO ENGAGE IN THE PROCESS ~354, ~356  3 WORKING DAYS | IT PRODUCTION TEAM SHALL REINFORCE SERVICE TRANSITION CONTENTS INCLUDING KNOWLEDGE MATERIALS, RESOLUTION TIERS, 2nd / 3rd LEVEL CONTACTS AND ARRANGE TRAINING DATE WITH IT SUPPORT ~358  ONE WEEK AHEAD BEFORE KNOWLEDGE TRANSFER | IT PRODUCTION TEAM HOLDS A KNOWLEDGE TRANSFER MEETING TO GO THROUGH ALL OF THE INFORMATION AND SHARES KEY INFORMATION. TRAINING AND QUESTION & ANSWER TO BE DONE AMONG INVOLVED PARTIES. ~360, ~362  TWO WEEKS AHEAD BEFORE GO-LIVE |
| KNOWLEDGE AND MATERIALS SYNC WITH KNOWLEDGE SYSTEM (SAMPLE - BASED ON CLIENT'S SPECIFIC REQUIREMENTS) | | | | |
| AGILE TECHNIQUE TO PROVIDE SERVICES | IT PRODUCTION TEAM TO REGISTER ONLINE WHEN SERVICES KICK-OFF IF NEEDED. BASIC PROJECT INFORMATION IS TO BE PROVIDED IN THIS PHASE ~380 | OWNER WILL REVIEW AND APPROVE THE SERVICES TRANSFER PROCESS-START. ARRANGES TEAM LEADERS TO BE ENGAGED IN THE PROCESS AND INFORMS THEM. ~382  1 - 3 WORKING DAYS | DAILY FEEDBACK  SPRINT 1 - X ~384  2 - 4 WEEKS | |
| NEW SERVICE TO TRANSITION PROGRAM MANAGEMENT PLATFORM (SAMPLE - BASED ON CLIENT'S SPECIFIC REQUIREMENTS) | | | | |

FIG. 3A

| PRACTICE LEARNING ~330 | TRAINING FEEDBACK ~332 | TRANSITION ACCEPTANCE REVIEW ~340 | CONTINUOUS FEEDBACK ~342 |
|---|---|---|---|
| ONE WEEK AHEAD ~334 | | GO-LIVE ~346 | |
| IT SUPPORT INVOLVED IN UAT TESTING ~364<br><br>ONE WEEK AHEAD BEFORE GO-LIVE | IT SUPPORT AND IT PRODUCTION TEAMS SHALL PROVIDE FEEDBACK OF THE TRAINING OUTCOME IF ACCEPTED AND WHETHER FURTHER TRAINING IS ~366 REQUIRED. THEREAFTER, IT SUPPORT TO CONFIRM THE TRANSITION IS COMPLETED AND WHETHER IT IS GOOD ENOUGH TO PROCEED TO NEXT PHASE. ~368 ONE WEEK AHEAD | IT TO SUPPORT THE ~370 SERVICES AFTER GO-LIVE. RECORD EVERY TICKET RELATED TO THE NEW SERVICE. ~372 CREATES LABEL FOR EACH NEW SERVICE | THE RELATED TICKETS WILL BE MAPPED TO SERVICE PLATFORM; IT PRODUCTION TEAM WILL SEE THE REAL-TIME STATUS OF THE TICKETS/~374 QUESTIONS/COMMENTS FROM END USERS. IT SUPPORT TEAM LEADER WILL REGULARLY REVIEW THESE FEEDBACKS FROM END USERS WITH IT PRODUCTION TEAM TO ADDRESS THEM ~376 |
| KNOWLEDGE AND MATERIALS SYNC WITH KNOWLEDGE SYSTEM (SAMPLE - BASED ON CLIENT'S SPECIFIC REQUIREMENTS) | | | |
| CONTENT REINFORCES KNOWLEDGE TRANSFER, USER ACCEPTANCE TEST, AND FEEDBACK. ~386<br><br>FOLLOWS THE SPRINT AND INVOLVES IT SUPPORT IN EACH SPRINT. IT SUPPORT WILL IDENTIFY AND DERIVE THE TIMETABLE OF EACH ~388 SPRINT.<br><br>THE PLATFORM WILL INCLUDE THE REQUIRED ~390 TEMPLATE AND NOTIFICATION OF EACH KEY MILESTONES | | CONTINUE FEEDBACK AND ISSUE RESOLUTION ~392 | |
| NEW SERVICE TO TRANSITION PROGRAM MANAGEMENT PLATFORM (SAMPLE - BASED ON CLIENT'S SPECIFIC REQUIREMENTS) | | | |

FIG. 3B

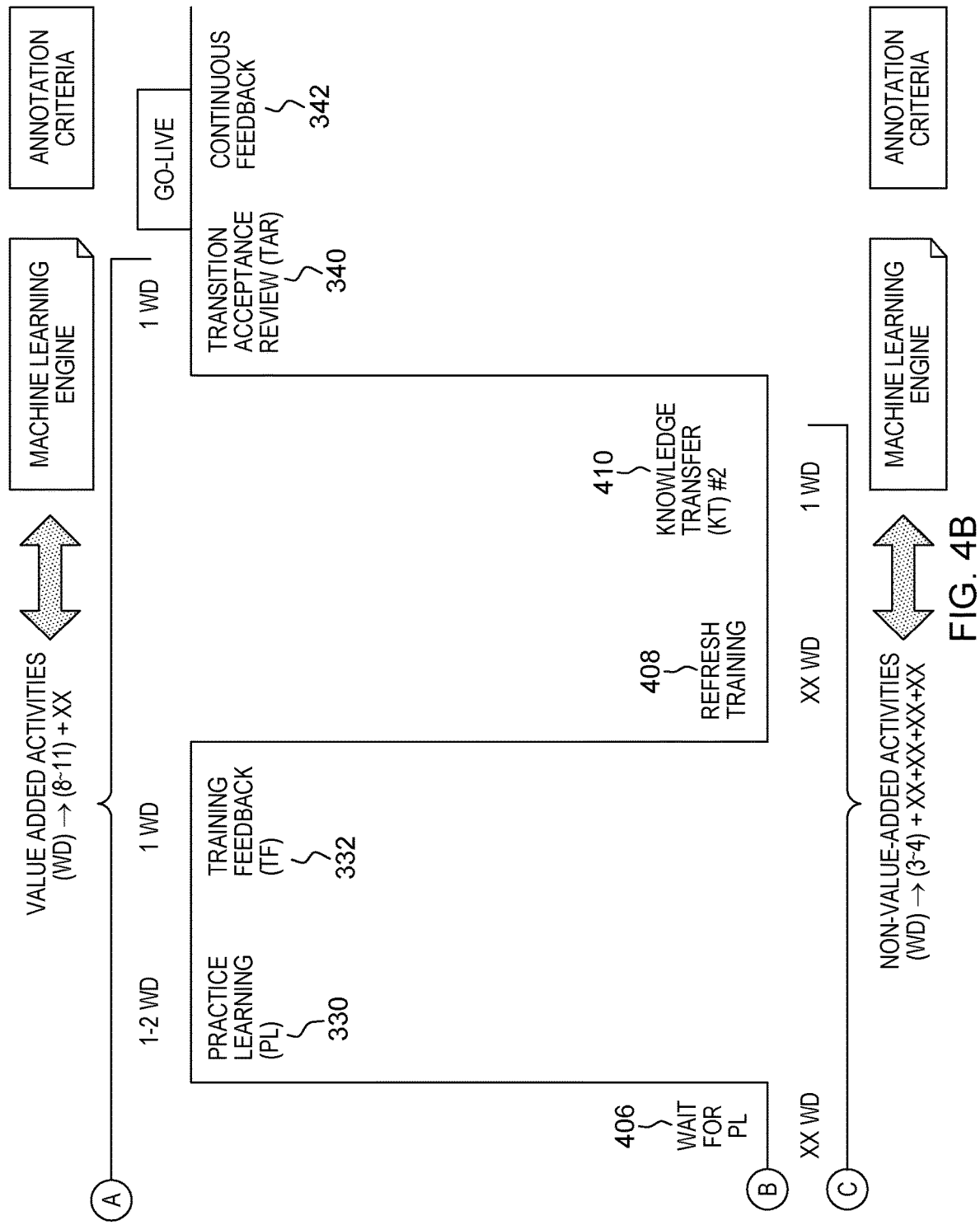

TRANSITIONING OF COMPUTER-RELATED SERVICES BASED ON PERFORMANCE CRITERIA WITH FLOW EFFICIENCY VALUE

BACKGROUND

One or more aspects relate, in general, to facilitating processing within a computing environment, and in particular, to facilitating the transitioning of computer-related services of the computing environment from one entity to another entity.

Computer-related services are used to perform computing tasks (e.g., run computer programs), to add functionality to a computing environment, to change an aspect of the computing environment (e.g., employ the cloud) and/or to optimize the computing environment, as examples. Existing computer-related services may be modified, added or deleted and/or new computer-related services may be provided.

The entity responsible for or owning the computer-related services, whether existing or new services, uses a process to integrate the computer-related services in the computing environment. That entity determines the computer-related services to be offered and creates a process to provide those services.

SUMMARY

Shortcomings of the prior art are overcome, and additional advantages are provided through the provision of a computer-implemented method to facilitate processing within a computing environment. The computer-implemented method includes obtaining a transitioning process to be used to integrate a computer-related service with one or more other computer-related services of the computing environment. The computer-related service and the one or more other computer-related services are analyzed to determine whether there is a conflict in integrating the computer-related service in the computing environment. A determination is made, based on at least the analyzing, whether one or more changes are to be made to a selected component to integrate the computer-related service in the computing environment. At least the analyzing and the determining whether one or more changes are to be made are part of an automated process generated to integrate the computer-related service. The automated process is at least a part of the transitioning process. An indication of a performance impact of executing at least the automated process to integrate the computer-related service is obtained, and the transitioning process to integrate the computer-related service in the computing environment is to continue based on the performance impact meeting one or more selected criteria and based on determining that there are not one or more changes to be made to the selected component.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts example activities of a traditional methodology to provide a computer-related service, in accordance with an aspect of the present invention;

FIG. 2 depicts example activities of an agile methodology to provide a computer-related service, in accordance with an aspect of the present invention;

FIGS. 3A-3B depict examples of a process to transition a computer-related service from one entity to another entity, in accordance with an aspect of the present invention;

FIGS. 4A-4B depict example contents based on work-day (WD) to transition a computer-related service from one entity to another entity, in accordance with an aspect of the present invention;

DETAILED DESCRIPTION

Figure 4A:
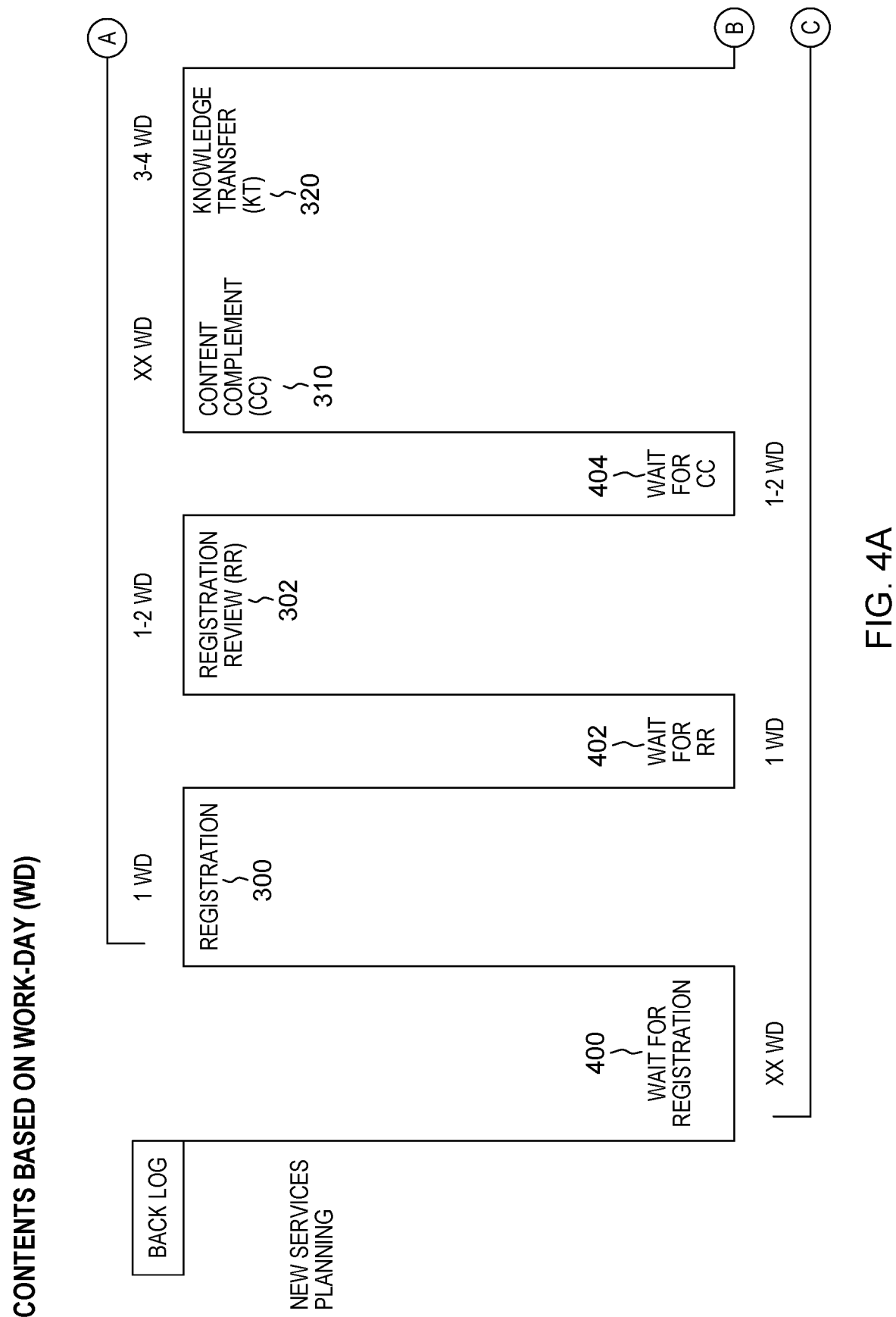

In accordance with one or more aspects, a capability is provided to transition one or more computer-related services (also referred to as services herein) of a computing environment from, e.g., an entity responsible for or owning the services, referred to herein as the client, to another entity, e.g., a service provider. The service provider generates a transitioning process, on behalf of the client, to integrate the one or more computer-related services into the client's computing environment. The transitioning occurs if, for instance, there is a performance benefit for the client.

In one aspect, the transitioning process includes generating an automated process to integrate the one or more computer-related services efficiently and effectively into the client's computing environment. The integrating includes integrating the one or more computer-related services with existing computer-related services of the client. A computer-related service to be integrated is referred to herein as a new computer-related service or a new service. A new computer-related service is an existing service being modified or a new service being offered. The transitioning process has a performance measurement incorporated therein that informs the client of performance implications of transitioning the one or more computer-related services to the service provider and/or performance implications of making requested or suggested change(s) to the client's computing environment.

Example computer-related services to be transitioned on behalf of, e.g., the client and integrated into the client's computing environment include support of new to be deployed applications; performing computing tasks; transforming an environment from on-premise physical systems to a private cloud or changing other aspects of the computing environment; introduction of changes to automate the existing services processes; deploying a hybrid cloud environment; optimizing the computing environment; adding functionality to the computing environment; providing certain accesses within the computing environment (e.g., access to a host IP address 10.x.x.x with relevant subnet); etc. There are many computer-related services that may be transitioned in accordance with one or more aspects. Those included herein are just examples and are not meant to be limiting in any way.

In one aspect, the transitioning process generated to transition services to, e.g., the service provider is evaluated based on quality and quantity. The evaluation is performed at one or more specific times, on a periodic basis or continually, as examples. In one aspect, changes to be made in the computing environment in order to transition the services and/or to integrate the services are detected, and training and awareness briefings are provided. In one aspect, roll outs, document changes and impacts are determined through review and analysis to improve the transitioning of the services. This review and analysis is performed automatically by, e.g., a processor, in one example. In one aspect, activities are analyzed, and information is logged into a machine learning engine, which is provided information to continually improve the process.

In one aspect, the transitioning process is based, for instance, on an agile methodology. However, in another embodiment, the transitioning process may be based on a traditional methodology (also referred to as a waterfall methodology). Each methodology includes a number of activities (also referred to as contents) to be performed during different phases of transitioning a computer-related service from one entity (e.g., a client) to another entity (e.g., a service provider). For instance, as shown in FIG. 1, a traditional methodology 100 includes a preparation phase 102, a knowledge transfer phase 104, an assist operation phase 106 and an ongoing operation phase 108. Each phase has an associated timeline 110 and associated contents 112. As examples, preparation phase 102 has a timeline 110 of 4 weeks before go-live and contents 112 include, for instance: input checklist; project team informs responsible teams by mail with checklist; prepare training material, define scope, knowledge transfer plan and questions and answers by project team; review checklist and schedule training session by project manager and technical leaders; and arrange resources for go-live, to be supported by team leaders. Knowledge transfer phase 104 has a timeline 110 of 2 weeks before go-live and contents 112 include, for instance, hold the training identified, and questions and answers. Assist operation phase 106 has a timeline 110 of at least keep 2 weeks and contents 112 include, for instance, monitor ticket trend and prepare further knowledge transfer; and sign transition completion report and exit. Further, ongoing operation phase 108 includes a timeline 110 of complete transition and contents 112 include, for instance, keep reviewing and optimize daily work. Other phases, timelines and/or contents are possible in other embodiments.

With reference to FIG. 2, an example of phases and activities for transitioning services in an agile methodology 200, in accordance with an aspect of the present invention, is shown. For instance, agile methodology 200 includes a project set up phase 202, one or more sprints 204-206, and an operation phase 208. A sprint is a short, repeatable phase to perform a task or activity. Each phase has an associated timeline 210 and associated contents 212. As an example, project set up phase 202 has a timeline 210 of the date the project is set up and contents 212 include, for instance: project team informs responsible team leaders, and a project release plan is provided. Further, as an example, Sprint 1 204 has a timeline 210 of 1 week before release and contents 212 include, for instance, input of a checklist, conduct training and provide training materials to team leaders. As further examples, Sprint 2 to Sprint X 206 have a timeline 210 of 2 weeks before release and contents 212 include, for instance, correct problems and conduct training, user acceptance testing (UAT) to be led by team leaders, input of checklist and continue training. Additionally, as an example, operation phase 208 has a timeline 210 of complete transition and contents 212 include, for instance, keep transition and perform regular review of whether any routine task can be handled by other services; and conduct long term and continuous knowledge transformation of the environment to be derived after operating it for, e.g., several months. Again, other phases, timelines and/or contents are possible in other embodiments.

As indicated, each methodology may be used to transition computer-related services from, e.g., a client to, e.g., a service provider. An example of a transition process for each methodology is depicted in FIGS. 3A-3B. As shown in FIG. 3A, a transition process includes a flow including a plurality of phases, such as register 300 and register review 302 during kick-off 304; content complement 310 during one week ahead of release or go-live 312; knowledge transfer 320 during two weeks ahead 322; practice learning 330 (FIG. 3B) and training feedback 332 during one week ahead 334; and transition acceptance review 340 and continuous feedback 342 during go-live 346. In other embodiments, other phases and/or timelines may be used.

In one example, referring to FIG. 3A, for the traditional methodology, as part of register 300, an Information Technology (IT) production team is to register online when services kick-off, if IT support is needed 350, and basic project information is provided 352. As part of register review 302, IT support services owner reviews and approves the services transfer process start 354, and arranges team leaders to engage in the process 356. One to three days is estimated for this phase. Further, as part of content complement 310, the IT production team reinforces the service transition contents including knowledge materials, resolution tiers and second and third contacts to be provided, as well as arranges a training date with IT support 358. This is estimated to occur one week ahead of go-live and before the knowledge transfer. Additionally, as part of knowledge transfer 320, the IT production team holds a knowledge transfer meeting to review the information and to share key information, if any, 360. Training and question and answer sessions are held amongst the involved parties 362. This is estimated to occur two weeks before go-live.

Further, referring to FIG. 3B, as part of practice learning 330, IT support is involved in user acceptance testing (UAT) 364, which is estimated to occur one week ahead of go-live. As part of training feedback 332, the IT support and IT production teams provide feedback of the training outcome, if accepted, and indicate whether further training is required or desired 366. Further, IT support confirms the transition is completed and indicates whether it is acceptable to proceed to the next phase 368. This is estimated to occur one week ahead of go-live. As part of transition acceptance review 340, IT is to support the services after go-live 370. It is to record every ticket related to the new service and is to create a label for each new service 372. Moreover, as part of continuous feedback 342, the related tickets are mapped to service platform(s) and the IT production team observes the real-time status of the tickets, as well as questions and/or comments from the end users 374. The IT support team leader regularly reviews this feedback from the end users with the IT production team in order to address the tickets, questions and/or comments 376.

Returning to FIG. 3A, in one example for the agile methodology, in accordance with an aspect of the present invention, as part of register 300, the IT production team registers online when services kick-off, if needed, and basic project information is provided in this phase 380. As part of register review 302, an owner reviews and approves the services transfer process-start, as well as selects team leaders to be engaged in the process and informs them 382. This is estimated to take 1-3 working days, as an example. Further, as part of content complement 310 and knowledge transfer 320, daily feedback of Sprints 1-X is performed 384. Example activities of Sprints 1-X include input checklist, conduct training, provide training materials, correct problems, and/or perform user acceptance testing. Additional, fewer and/or other activities may be performed.

Moreover, referring to FIG. 3B, as part of practice learning 330 and training feedback 332, the contents include reinforcing the knowledge transfer, user acceptance testing and feedback 386. Each Sprint is followed, and IT support is involved in each Sprint. IT support identifies and derives the timetable of each Sprint 388. The platform includes, e.g., a template and notification of each milestone 390. Additionally, in one example, transition acceptance review 340 and continuous feedback 342 includes continuous feedback and issue resolution 392. The agile methodology enables an automated process to be used to execute the change and seek approval for the change without the intervention of operation team members, which is different from the traditional methodology that involves many operation team members.

In accordance with an aspect of the present invention, a mapping of the transition flow process, including the phases (or contents of the phases), is generated to provide a quantitative value (e.g., work-days) to be used to determine flow efficiency. One example of the mapping is depicted in FIGS. 4A-4B, in which the phases of transitioning and example estimated work-days to perform the contents of the phases are depicted. As shown in FIG. 4A, it is estimated that registration 300 takes 1 work-day; registration review (RR) 302 1-2 work-days; content complement (CC) 310 XX work-days (e.g., an average number of work-days, such as 5); knowledge transfer (KT) 320 3-4 work-days; practice learning (PL) 330 (FIG. 4B) 1-2 work-days; training feedback (TF) 332 1 work-day; transition acceptance review (TAR) 340 1 work-day; and continuous feedback 342 takes place when go-live. These phases (e.g., 300-342) are referred to as value added activities in determining flow efficiency, as described below. Although example phases and work-days are provided, additional, fewer and/or different phases, and/or additional, fewer and/or a different number of work-days may be used.

In addition to the value added activities, in one embodiment, other phases or activities are included that are referred to as non-value added activities. As examples, these include wait for registration 400 (FIG. 4A), which is estimated to take XX work-days; wait for registration review 402, which is estimated to take 1 work-day; wait for content complement 404, which is estimated to take 1-2 work-days; wait for practice learning 406 (FIG. 4B), which is estimated to take XX work-days; wait for refresh training 408, which is estimated to take XX work-days; and knowledge transfer #2 410, which is estimated to take 1 work-day.

In accordance with an aspect of the present invention, the value added and non-value added activity times are used determine flow efficiency of the transitioning process. For example, the following equation is used, in accordance with an aspect of the present invention: Estimated Flow Efficiency→[Value Added Activity Time/(Value Added Activity Time+Non-Value Added Activity Time)]*100%, where in one example, the value added activity time is the estimated number of work days to perform registration, register review, content complement, knowledge transfer, practice learning, training feedback, transition acceptance review and continuous feedback; and the non-value added activity time is the estimated number of days for wait for registration, wait for registration review, wait for content complement, wait for practice learning, refresh training and knowledge transfer.

Using the above equation, the estimated flow efficiency of the process depicted in FIGS. 4A-4B is:

$$[\text{Value Added Activity Time}/$$
$$(\text{Value Added Activity Time} + \text{Non-Value Added Activity Time})] * 100\%$$
$$= [8 \sim 11) + XX] / [8 \sim 11) + XX] + [3 \sim 4) = XX^*4]^* 100\%,$$

where $XX$ is assumed to be an average $XX = 5$ work-days, and $\sim$ means to; e.g., 8 to 11 work-days or 3 to 4 work-days $$= 37\% \sim 52\%.$$

Based on the foregoing analysis, it is determined that the information is asymmetric and that: continuous improvement of value-added activity efficiency is desired; a reduction of non-value added activity time (when same value-added activity time) will reflect an improvement in the flow efficiency value; an introduction of effective knowledge transfer will reduce non-value added activity time; actions are to be injected on the reduction of XX time; and a specific mechanism is to be provided to estimate this time.

The determined value is used, for instance, to define the achievement of the transition of a service from, e.g., a client to, e.g., a service provider. Based on the determined value and/or values maintained in a backlog, the transition of a new service may be adjusted. In one example, the transition is adjusted based on transitioning a selected list of contents (e.g., aspects of a service) at any time according to the latest business requirements and evaluating via, e.g., machine learning to ensure that the most suitable services are transitioned from the existing computing environment (also referred to herein as an operating environment). Example selected contents include, but are not limited to, a computer-implemented service desk with customer relationship management database with machine learning integration; continued integration and/or continued deployment for Dev Op; infrastructure and application management with machine learning enhancement, etc. Many other contents may be selected, e.g., automatically, to be transitioned. The examples provided herein are not meant to be limiting in any way.

One embodiment of a transitioning process used to transition computer-related services from one entity (e.g., a client) to another entity (e.g., a service provider) is described with reference to FIG. 5. In one example, aspects of the process are obtained (e.g., received, retrieved, generated, etc.) and executed by a processor of the computing environment (e.g., the client's computing environment).

Figure 5:
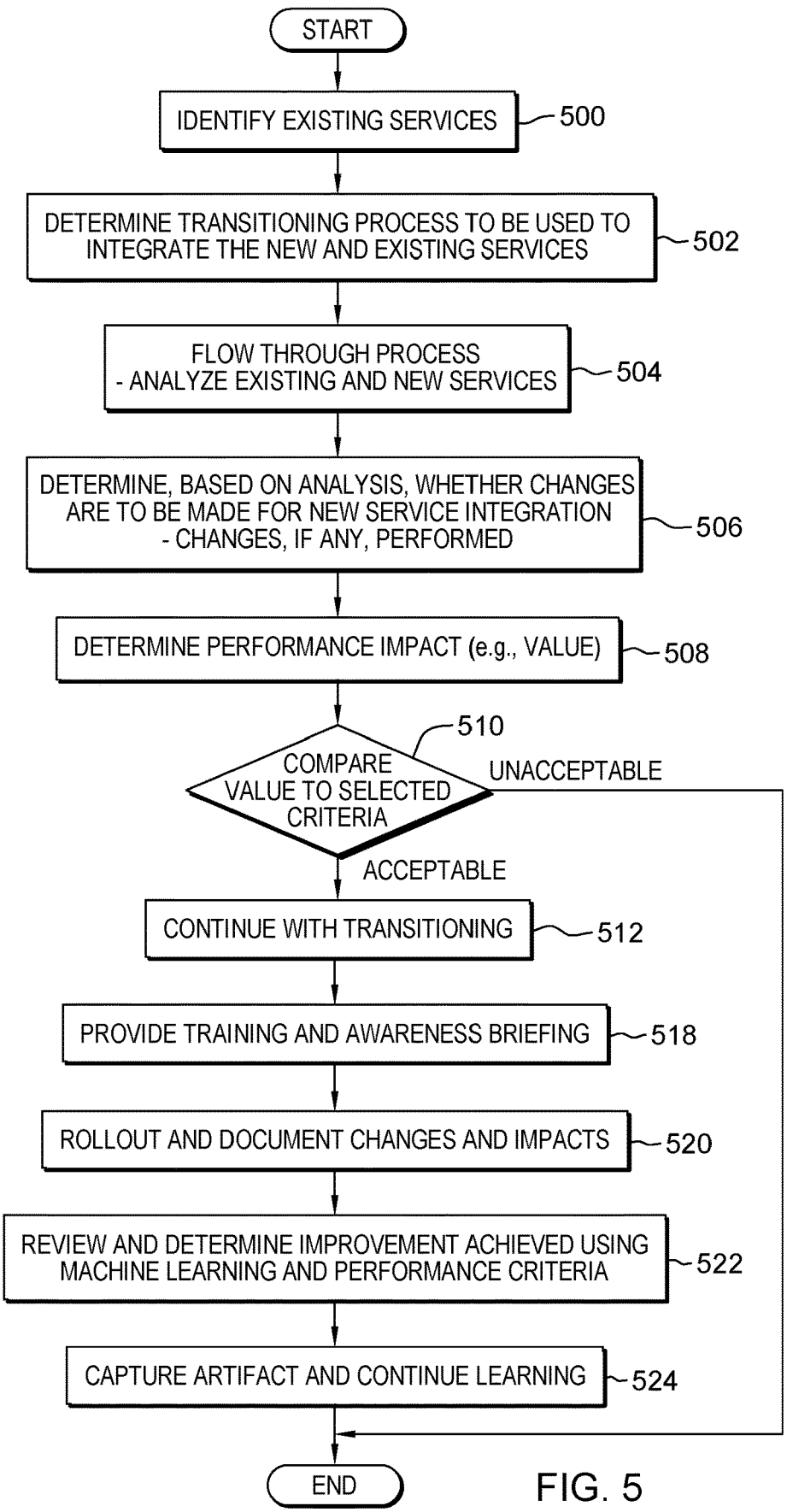
FIG. 5 depicts an example of a process flow used to transition a computer-related service from one entity to another entity, in accordance with an aspect of the present invention.

Referring to FIG. 5, in one embodiment, the processor identifies one or more existing computer-related services of the computing environment, STEP 500. For example, the processor checks a repository that includes, for instance, an operation run book that documents existing services.

The processor determines (e.g., automatically generates) a process (e.g., an automated process) to be used to integrate at least one new computer-related service with one or more identified existing services of the computing environment, STEP 502. For instance, the processor gathers information based on the service to be transitioned and the current operating environment of the client. Based on the information, the processor determines a set of tasks or activities to be used to integrate a new service into the current operating environment.

For instance, if the service is a request to enable access to a host (IP address 10.x.x.x with relevant subnet), example tasks include: receiving the request; determining environment parameters related to the request that indicate components of the computing environment that may be impacted (e.g., entire production environment); determining requirement parameters for the request (e.g., full access segment by a host to a range of IP addresses 10.x.x.0 to 10.x.x.255); checking the request, environment parameters and requirement parameters against annotation data that defines one or more rules to be met to integrate the service (e.g., rule: access from a host is based on IP address and network segment; this is pre-defined and agreed to (e.g., user is to be from sales team to be granted access)) to determine whether the service is to be integrated (e.g., is access permitted, will environment still run as expected, etc.); adding the service based on the checking indicating it is acceptable. Additional, fewer and/or other tasks may be performed (e.g., executed on one or more processors) to transition and integrate the requested service of enabling access to a host. Further, other tasks will be used for other services, dependent on the services.

The processor flows through the process, STEP 504. As an example, the processor evaluates each task of the set of tasks against the requirements obtained from the services owner and/or from one or more other providers of requirements (e.g., operation lead, development operations (Dev Ops) team, reliability engineer, etc.) and against annotation data (e.g., rules for integrating) to determine whether any changes are to be made to a selected component (e.g., the process and/or the computing environment) to integrate the requested service, STEP 506. In one example, as part of the flow through, the processor analyzes the existing services and the new service to determine if there is any conflict in integrating the new service. If there is a conflict, one or more changes are made to the selected component to eliminate the conflict (e.g., a change is made so that the requested host access can be granted; e.g., annotation data is updated by the processor, etc.) or the transitioning process ends until one or more changes may be made.

Further, in accordance with one or more aspects, a performance impact of the transitioning is determined, STEP 508. As an example, the performance equation and/or machine learning is used to determine a performance impact (e.g., a flow efficiency value) of the transitioning. The determined value is compared to one or more selected criteria (e.g., is to be 20% better than the client's process) to determine if the process should continue, INQUIRY 510. If the one or more selected criteria are not met, the transitioning process is ended and one or more changes are made to the process and/or the environment prior to re-executing the process. If the one or more selected criteria are met, the transitioning process continues.

For instance, if the performance impact is acceptable and no further (or any) changes are needed, then the processor executes each of the tasks to proceed with the integration of the computer-related service into the client's computing environment, STEP 512. The tasks to be performed to transition and integrate the requested service depend on the service itself.

Further, in one embodiment, training and awareness briefing are provided, STEP 518. In one example, the processor generates a training program based on the service that is transitioned and provides a briefing that may be shared with the team leaders and/or others. The processor rolls out the process and documents changes and impacts, STEP 520. Further, the processor performs analysis and reviews to determine the improvement achieved, STEP 522. In one example, machine learning is used to perform the analysis and review, and the machine learning uses codes based on the performance equation and criteria. As an example, machine learning powered by TensorFlow®, an artificial intelligence library, is used to verify performance and to continue learning. For example, with an offering of an operation support representative as a computer-related service, required and/or optimal information is provided, and learning from the environment using the machine learning algorithm is continued with the intent to understand different queries related to the environment. TensorFlow is a registered trademark of Google LLC, Mountain View, California.

Sample Code for machine learning of a query request related to the environment using TensorFlow (tf) and keras, which acts as an interface for the TensorFlow library, is provided below:

```
Create the Model
with strategy.scope( ):
    model = tf.keras.Sequential([
        tf.keras.layers.Conv2D(32, 3, activation='relu', input_shape=(28, 28, 1)),
        tf. keras.layers.MaxPooling2D( ),
        tf. keras.layers.Flatten( ),
        tf.keras.layers.Dense(64, activation='relu'),
        tf.keras.layers.Dense(10)
    ])
```

```
model.compile(loss=tf. keras.losses.SparseCategoricalCrossentropy
(from_logits=True),
      optimizer=tf.keras.optimizers.Adam( ),
      metrics=['accuracy'])
Define the call_backs
```

The call_backs to be used are:

TensorBoard: This call_back writes a log for TensorBoard which allows the graphs to be visualized.

Model Checkpoint: This call_back saves the model after every epoch.

Learning Rate Scheduler: Using this call_back, the learning rate to change after every epoch/batch can be scheduled.

For illustrative purposes, add a print call_back to display the learning rate.

```
# Define the checkpoint directory to store the checkpoints?
checkpoint_dir = './training_checkpoints'
# Name of the checkpoint files
checkpoint_prefix = os.path.join(checkpoint_dir, "ckpt_{epoch}")
# Function for decaying the learning rate.
# You can define any decay function you need.
def decay(epoch):
    if epoch < 3:
        return 1e-3
    elif epoch >= 3 and epoch < 7:
        return 1e-4
    else:
        return 1e-5
# Callback for printing the DISPLAY at the end of each epoch.
class PrintLR(tf.keras.callbacks.call_back):
    def on_epoch_end(self, epoch, logs=None):
        print('\nLearning rate for epoch { } is { }'.format(epoch + 1,
             model.optimizer.lr.numpy( )))
call_backs = [
    tf.keras.call_backs.TensorBoard(log_dir='./logs'),
    tf.keras.call_backs.ModelCheckpoint(filepath=checkpoint_prefix,
        save_weights_only=True),
    tf.keras.call_backs.LearningRateScheduler(decay),
    PrintDISPLAY( )
]
```

Continuing with FIG. 5, in one embodiment, the processor captures the artifact (e.g., the information gathered, determined and used), and machine learning is continued, STEP 524. Cross-checking and continual learning from the services to be provided are performed based on a measurable performance outcome. The activities and related logs that are captured are injected and integrated into an aspect of the invention based on analysis of a machine learning engine for performance verification and machine learning. In one example, as indicated above, the machine learning engine uses TensorFlow, which is an artificial intelligence library that uses data flow graphs to build models for machine learning. It is also used for classification, perception, understanding and prediction. Although TensorFlow is provided as one example, other libraries may be used.

Further details of an embodiment of a transitioning process used to transition computer-related services from one entity (e.g., a client) to another entity (e.g., a service provided) are described with reference to FIG. 6. In one embodiment, aspects of the transitioning process are obtained (e.g., received, retrieved, generated, etc.) by a processor of the client's computing environment and executed to transition a service from one entity to another entity.

Figure 6:
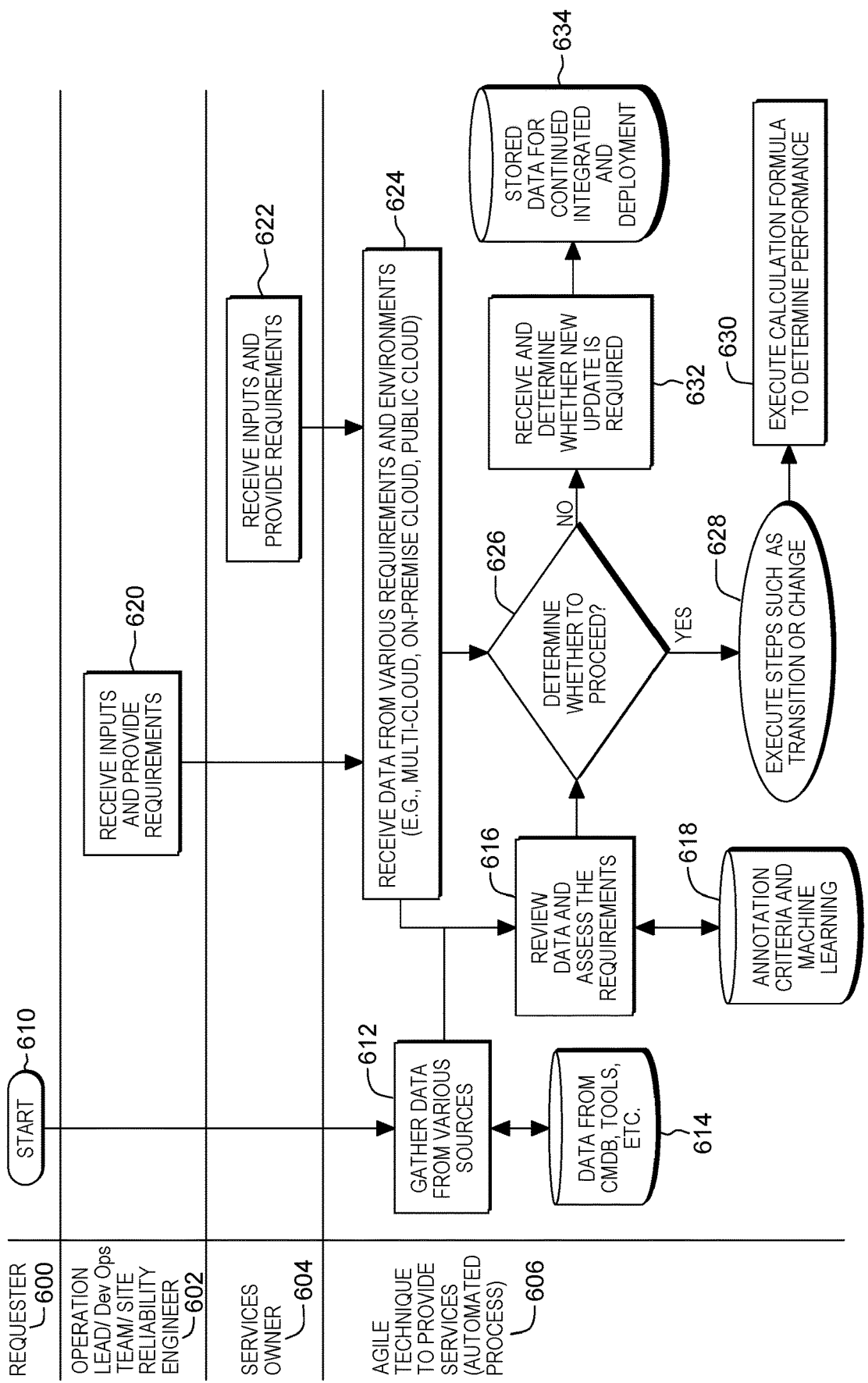
FIG. 6 depicts further details of an example of a process flow used to transition a computer-related service from one entity to another entity, in accordance with an aspect of the present invention.

Referring to FIG. 6, in one embodiment, the processor receives an indication from a requester 600, such as a selected Operation Officer or other requester, that the gathering of data to be used to integrate one or more services is being initiated, STEPS 610, 612. The processor executes an automated process 606, generated by, e.g., a processor in accordance with an aspect of the present invention, that gathers, STEP 612, based on receiving the indication of initiating gathering, the data from various sources 614. Example sources include a Configuration Management Database (CMDB) that maintains stored changes of the environment, and selected tools, such as a monitoring tool that captures changes and/or an event management tool that determines event management flow, etc. The information captured includes, for instance, an identification of existing services. As part of this step, in one example, the set of activities or tasks to be taken to integrate a new service with existing services is determined by the processor. For instance, if an existing process is: continued service operation management, and a new process is: an add-on of an automated change request, the final stage is: integrate existing and new processes (a fully automated change request) from request, verify, change and close.

Further, in one example, automated process 606 obtains (e.g., receives, retrieves, is provided) requirements from an entity 602, such as an Operation Lead, Developer Operations (Dev Ops) Lead, a Site Reliability Engineer, and/or others, STEPS 620, 624. The requirements are of the existing environment. Further, in one example, automated process 606 obtains requirements from a services owner 604 based on inputs received by the services owner relating to services to be integrated, STEPS 622, 624.

Automated process 606 reviews the gathered data and assesses the received requirements to integrate one or more computer-related services into the client's computing environment, STEP 616. The assessment includes, for instance, analyzing the requested computer-related service and the identified one or more existing computer-related services to determine whether there is a conflict in integrating the service. Example conflicts include: would the request inappropriately provide access to a component; would the request cause a malfunction within the client's environment; etc.

In one example, the data is reviewed and analyzed based on annotation data (e.g., criteria) and using machine learning 618. Annotation criteria are used in reviewing the gathered data and assessing the requirements. Annotation data is based on a continuing change of services to be transitioned or introducing new requirements. Annotations are used in order to add contents about providing services (e.g., taking over or changing services) based on a requirement to provide better explanations of the contents (e.g., activities, etc.) to be used for the services transitioning activities. Annotation is also used to identify patterns and confirm the contents to be used for verification.

Automated process 606 determines, based on the received inputs and the analysis, whether to proceed with the transitioning pursuant to the reviewing and assessing of the requirements, INQUIRY 626. The outcome of the analysis determines whether continued execution of transitioning current actions or introducing new actions in the environment achieve a desired performance. For instance, a determination is made of a performance impact of the transitioning process, using, e.g., the performance equation and/or machine learning, and compares the impact (e.g., the flow efficiency value) to one or more selected criteria (e.g., is to be 20% better than the client's process) to determine if the process should continue. If the one or more selected criteria are not met, the transitioning process is ended and one or more changes are made to the process and/or the environment prior to re-executing the process. If the one or more selected criteria are met, the transitioning process continues.

If the determination is made to proceed, then the automated process executes the tasks to provide the services (e.g., integrate new service), STEP 628. Further, in accordance with an aspect of the present invention, automated process 606 executes the performance equation of an aspect of the present invention to determine the performance impact of transitioning the services, STEP 630. This may be used to indicate the performance benefit to the client and may be saved and/or used in machine learning for further improvement.

Returning to INQUIRY 626, if it is determined that the transitioning is not to continue, then automated process 606 determines whether a new update is to be performed (e.g., change the network; permit access, etc.), STEP 632. If the update is to be performed, steps are taken to provide the update and the transitioning may be re-started at a selected point. Further, in one example, automated process 606 stores data related to the transitioning of the services for continued integration and deployment, STEP 634. In one example, the entire analysis and actions are stored in a repository for continued integration in the deployed environment. The activities captured are used to calculate a performance assessment in order to determine whether the process achieves the identified target (i.e., whether performance assessment meets one or more selected criteria; e.g., a certain percentage). The storing is performed, in one embodiment, regardless of whether the transitioning process proceeds to completing integration.

In one example, the performance assessment is based on a probability of an outcome driven by, for instance, an artificial intelligence (AI) library, such as TensorFlow. TensorFlow uses, for example, data flow graphs to build models for machine learning. TensorFlow is used to train and run sequence to sequence models for activity processing based simulation. It supports outcome prediction with the same models to be used for training.

The estimated flow efficiency formula described above is programmed in TensorFlow, in one example, to assess performance of the process to transition services for an entity.

As described above, a transitioning process is created to transition services from one entity, e.g., a client, to another entity, e.g., a service provider, efficiently and effectively. The transitioning process includes a performance measurement that indicates a performance impact of transitioning the services. Aspects of the transitioning process, including but not limited to the automated process of the transitioning process, are performed by at least one processor, as described herein.

Figure 7:
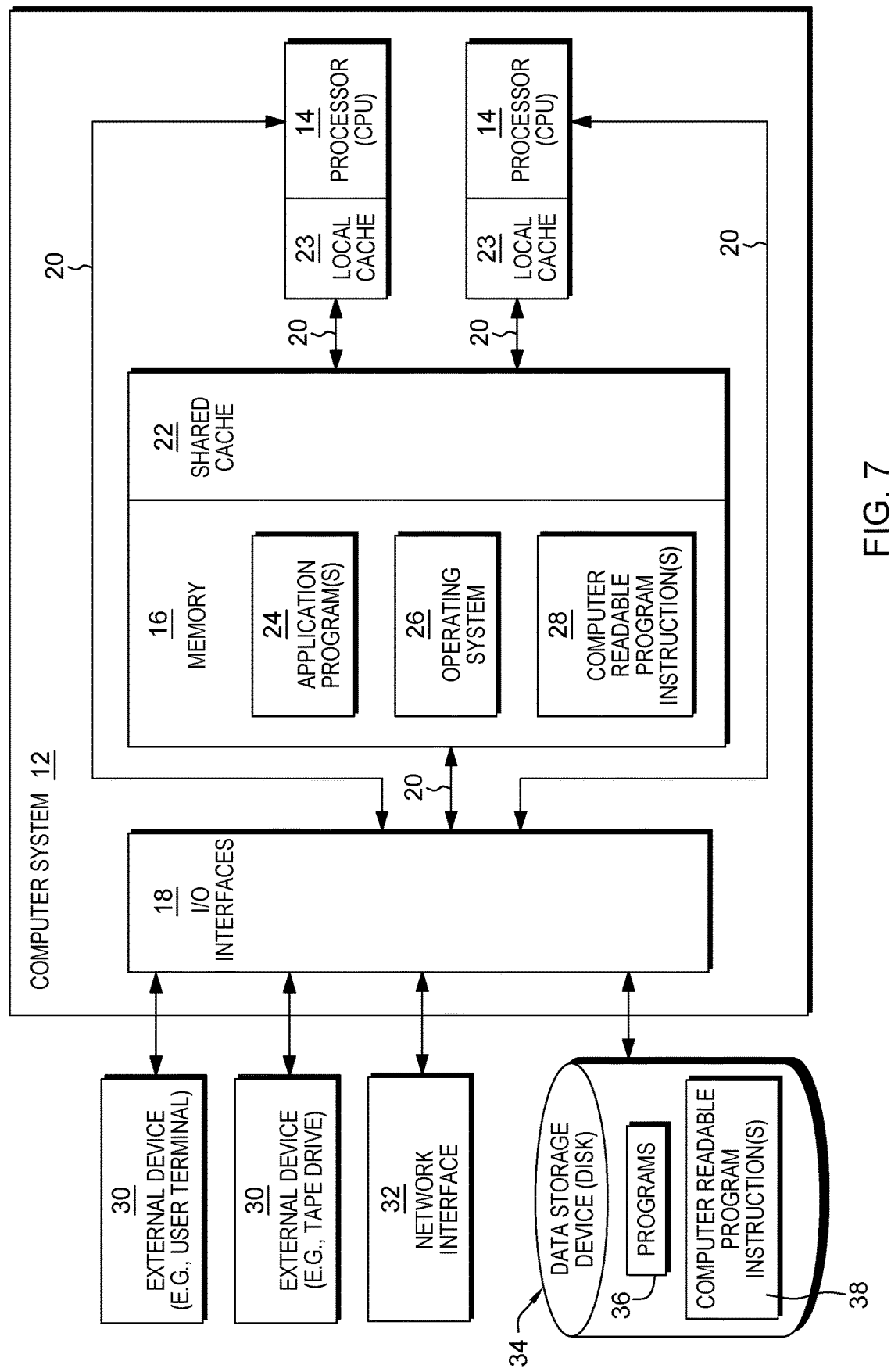
FIG. 7 depicts one example of a computing environment to incorporate and use one or more aspects of the present invention.

In one embodiment, the at least one processor is part of a computing environment, an example of which is depicted in FIG. 7. As shown in FIG. 7, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30 and a network interface 32. External devices 30 include, for example, a user terminal, a tape drive, a pointing device, a display, etc., as well as one or more data storage devices 34. Data storage device 34 may store one or more programs 36, one or more computer readable program instructions 38, and/or data, etc. The computer readable program instructions may be configured to carry out functions of embodiments of aspects of the invention.

Network interface 32 enables computer system 12 to communicate with one or more networks, such as a local area network (LAN), a general wide area network (WAN), and/or a public network (e.g., the Internet), providing communication with other computing devices or systems.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples include, but are not limited to: microcode, device drivers, redundant processing units, external disk drive arrays, RAID systems, tape drives, and data archival storage systems, etc.

Computer system 12 may be operational with numerous other general-purpose or special-purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more engines to perform one or more aspects of the present invention. These engines may be stored in memory, including main memory (e.g., memory 16) and/or one or more caches (e.g., shared cache 22, local cache 23) and/or external storage (e.g., device 34), and may be executed by one or more processors (e.g., processor 14).

Figure 8:
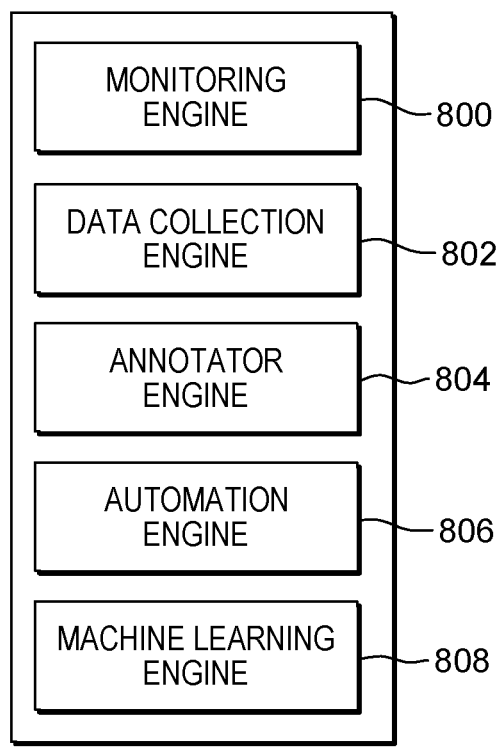
FIG. 8 depicts examples of engines that may be used to transition a computer-related service from one entity to another entity, in accordance with one or more aspects of the present invention.

In one example, referring to FIG. 8, the engines of a processor (e.g., processor 14) that may be used to transition services from one entity (e.g., a client) to another entity (e.g., a service provider) include a monitoring engine 800, a data collection engine 802, an annotator engine 804, an automation engine 806 and a machine learning engine 808, as examples. Although various engines are described, aspects of the invention may be performed by one or more of the engines. There may be additional, fewer and/or different engines used to perform one or more aspects of the present invention. Each of the engines is described further below.

Monitoring engine 800 monitors, for instance, the changes made to a client's current operating environment to obtain data to be used to measure the performance of changes made based on a flow efficiency calculation (an example of which is described herein) from the activities derived. As an example, a new change request can have the following validations or some form of confirmations before it is processed for approval and execution: configuration item from Change Management Database (e.g., store the changes); configuration item in a monitoring tool (e.g., capture the changes); monitoring attributes, thresholds and dependencies of the particular configuration item (e.g., monitoring components of the system); monitoring event roles from an event management tool (e.g., determine event management flow); attributes of other integrated system management tools (e.g., Patch Management); time slots (e.g., allocated time); dependencies (e.g., related to input and output); conflicts (e.g., any error or impact); and errors (e.g., unsuccessful change).

In one example, the monitoring engine is used to determine when a new update is to be provided (e.g., STEP 632 of FIG. 6). In one or more aspects, monitoring engine 800 performs one or more of the following: reads multiple sources (e.g., 614 of FIG. 6); executes one or more tasks on the actual system or through execution tools (e.g., 628 of FIG. 6); and/or queries through an ITSM (IT Service Management) tool, monitoring tool, event management tool, system automation tool, system management tools, and/or a configuration management database in the client environment (e.g., 614 of FIG. 6). Monitoring Engine 800 collects the data in the form of attributes in a pre-change state; develops a post-change status based on cognitive calculations; flashes post change state gaps; executes post change tasks; performs confirmations and/or enables a change closure flag, as examples.

Monitoring component 800 utilizes, in one or more aspects, various data inputs to build the application affinities (e.g., grouping of related components) between the various functions, such as application middleware, database, platform, operating system and integration hub. It utilizes software defined networking to build the software firewalls and macro-segmentation instances. It utilizes, in one example, commercially available software to determine the spread of unwanted code installation.

Data collection engine 802 is used to collect the data from the various sources, such as the CMDB and/or other tools, and/or is used to gather the requirements from various entities, such as the requestor, Operation Lead/Dev Ops Team/Site Reliability Engineer and/or Services Owner. In one or more aspects, data collection engine 802 is defined to perform the following: breakdown the tasks to be performed to transition a computer-related service from one entity to another entity; validate the transition algorithm; perform conflict checksum management to ensure the outcome derived from the changes made to the environment are consistent and will not negatively impact the new environment (a checksum is a small-sized datum derived from a block of digital data for the purpose of detecting errors that may have been introduced during its transmission or storage); flash a change dependency mapping to show the before and after and to ensure that the operating environment has a clear construct of what is the final stage without any components missing (e.g., change of core manufacturing system—an existing environment may have 20 integration points and 50 components. The change may result in 30 integration points and 35 components. The change resulted from the validations or some form of confirmations before it is processed for approval and execution); take input for automatic change deployment and validation; take valid parameters for pre-approved change or trigger a new change or change task in the system; create metadata for the automation engine; take a time slot from the change ticket for the fulfillment; change closure will either flash the take and take input as committed or execute the task; re-work one or more tasks and/or workloads; resolve conflicts; and/or perform error resolution.

Annotator engine 804 receives outputs from analysis as follows: Provide Services: The activities are not able to meet the requirements based on a rule, such as a business rule. An example business rule is that the activity is to be able to improve the performance by a select performance (e.g., 20%) in terms of cost and timeline. The annotator engine decides, for instance, to stop those activities identified based on performance assessment and outcome driven by output of, for instance, a performance assessment and machine learning module.

Automation engine 806 is used, in one example, to generate the automated process and/or other aspects of the transitioning process. In one example, the automation engine reviews the activities to be performed and removes repetitive activities to ensure errors are prevented and efficiency is achieved (e.g., ensures a report is generated automatically and not manually).

Machine learning engine 808 is used to provide cognitive technology and/or machine learning to transition a computer-related service to a service provider. Machine learning is used, for instance, to collect data regarding the transitioning of the services and to evaluate the data to continue learning. Machine learning algorithms generate and train algorithms to create a model utilized to train and/or evaluate the transitioning. For instance, in an initialization stage, program code (e.g., hardware and/or software) trains these algorithms, based on, for instance, patterns and/or other data. With the machine learning engine and annotation, cross-checking may be performed, along with continuous learning from the services to be transitioned or new services are introduced based on the measurable performance outcome.

Figure 9:
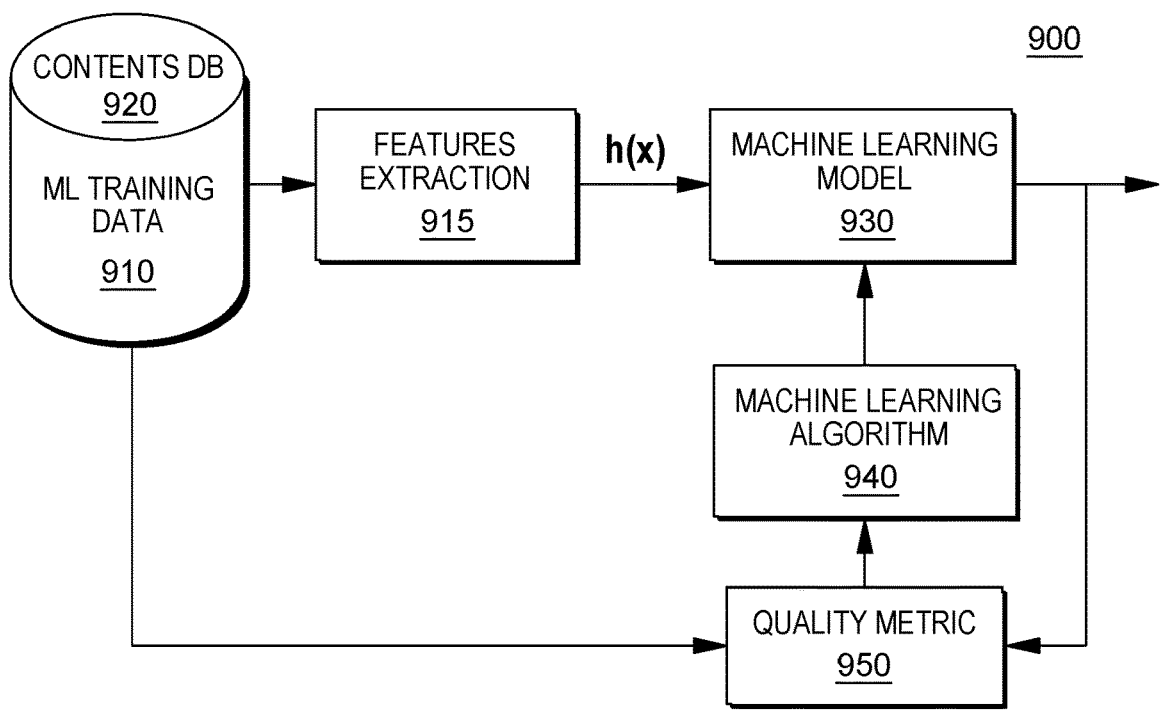
FIG. 9 depicts one example of using machine learning in one or more aspects of the present invention.

FIG. 9 is an example of a machine learning training system 900 utilized, in one or more aspects, to perform cognitive analyses of various inputs, including gathered data, parameters and/or requirements. Training data utilized to train the model in one or more embodiments of the present invention includes, for instance, data that is specific to the transitioning and/or integration of a computer-related service. The program code in embodiments of the present invention performs a cognitive analysis to generate data structures, including algorithms utilized by the program code to make predictions, such as to predict performance impacts. Machine learning (ML) solves problems that are not solved with numerical means alone. In this ML-based example, program code extracts various features/attributes/data from ML training data 910 (e.g., information collected from various data sources relevant to the transitioning; received inputs and/or requirements), which may be resident in one or more databases 920. Features extraction 915 is utilized to develop a predictor function, h(x), also referred to as a hypothesis, which the program code utilizes as a machine learning model 930.

In identifying various states and/or behaviors indicative of states in the ML training data 910, the program code can utilize various techniques including, but not limited to, mutual information, which is an example of a technique that can be utilized to identify features (e.g., elements, patterns, attributes, etc.). Further, varying techniques may be used to select features, including but not limited to, diffusion mapping, principal component analysis, recursive feature elimination (an approach to selecting features), and/or a Random Forest, to select the attributes related to various subject states (e.g., training/test data). The program code may utilize a machine learning algorithm 940 to train the machine learning model 930 (e.g., the algorithms utilized by the program code), including providing weights for the conclusions, so that the program code can train the predictor functions that comprise the machine learning model 930. The conclusions may be evaluated by a quality metric 950. By selecting a diverse set of ML training data 910, the program code trains the machine learning model 930 to identify and weight various attributes (e.g., features, patterns, data) that correlate to various states of a subject (e.g., transitioning process, the environment, etc.).

The model generated by the program code is self-learning as the program code updates the model based on active feedback received from subjects (e.g., the transitioning process and/or the environment). For example, when the program code determines that there is material to be learned that was not previously predicted by the model, the program code utilizes a learning agent to update the model to reflect that information, in order to improve predictions in the future. Additionally, when the program code determines that a prediction is incorrect, either based on receiving user feedback through an interface or based on continuously monitoring the subject, the program code updates the model to reflect the inaccuracy of the prediction for the given period of time. Program code comprising a learning agent cognitively analyzes the data deviating from the modeled expectations and adjusts the model in order to increase the accuracy of the model, moving forward.

In one or more embodiments, program code executing on one or more processors, utilizes an existing cognitive analysis tool or agent to tune the model, based on data obtained from the various data sources. One or more embodiments utilize, for instance, the IBM Watson® system as the cognitive agent; however, other cognitive agents may be used. In one or more embodiments, the program code interfaces with, e.g., IBM Watson application programming interfaces (APIs) to perform a cognitive analysis of obtained data. Again, other cognitive agents and/or other program code interfaces of International Business Machines Corporation™ and/or of other companies may be used. IBM, IBM Watson, International Business Machines Corporation, Developer Cloud and TrueNorth are registered trademarks or trademarks of International Business Machines Corporation in at least one jurisdiction.

In one or more embodiments, the program code trains aspects of one or more IBM Watson application program interfaces (APIs) to learn the material being taught. Utilizing an existing cognitive agent, such as the IBM Watson system, expands the type of subject data that the program code can integrate into the model. For example, data can include documentary, text, visual, and audio data, which the program code can process, based on its utilization of the IBM Watson system. Specifically, in one or more embodiments, certain of the APIs of the IBM Watson system comprise a cognitive agent (e.g., learning agent) that includes one or more programs, including, but not limited to, natural language classifiers, Retrieve and Rank (i.e., a service available through the IBM Watson® Developer Cloud™ (or others) that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. The IBM Watson application program interfaces (APIs) can also provide audio related API services, in the event that the collected data includes audio, which can be utilized by the program code, including but not limited to natural language processing, text to speech capabilities, and/or translation.

In one or more embodiments, the program code utilizes a neural network to analyze the collected, learned and/or generated data to generate the model utilized for training and/or evaluation. Neural networks are a biologically-inspired programming paradigm which enable a computer to learn from observational data, learned data, generated data, and/or other data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., states) in data (i.e., neural networks are non-linear statistical data modeling or decision-making tools). In general, program code utilizing neural networks can model complex relationships between inputs and outputs and identify patterns in data and to generate conversation and/or evaluate such conversation. Because of the speed and efficiency of neural networks, especially when parsing multiple complex data sets, neural networks and deep learning provide solutions to many problems in multiple source processing, which the program code in one or more embodiments accomplishes when obtaining data and generating a model for evaluation and/or training of artificial intelligence-based processes.

One or more embodiments may utilize a neural network (NN) to predict future states of a given subject (e.g., predict future performance). Utilizing the neural network, the program code can predict the likelihood of the given state at a subsequent time. The program code obtains (or derives) data related to the subject and/or content being learned from various sources to generate an array of values (possible states) to input into input neurons of the NN. Responsive to these inputs, the output neurons of the NN produce an array that includes the predicted states. The program code can automatically transmit notifications related to the predicted states based on the perceived validity.

In one or more embodiments, a neuromorphic processor or trained neuromorphic chip can be incorporated into the computing resources executing the program code. One example of a trained neuromorphic chip that is utilized in an embodiment of the present invention is the IBM® TrueNorth™ chip, produced by International Business Machines Corporation. Other trained neuromorphic chips produced by International Business Machines Corporation and/or other companies may be used.

The IBM TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has, e.g., 256 programmable synapses that convey the signals between them. Hence, the total number of programmable synapses is just over, e.g., 268 million ($2^{28}$). Memory, computation, and communication are handled in each of the neurosynaptic cores, so TrueNorth circumvents the von-Neumann-architecture bottlenecks and is very energy-efficient.

Figure 10:
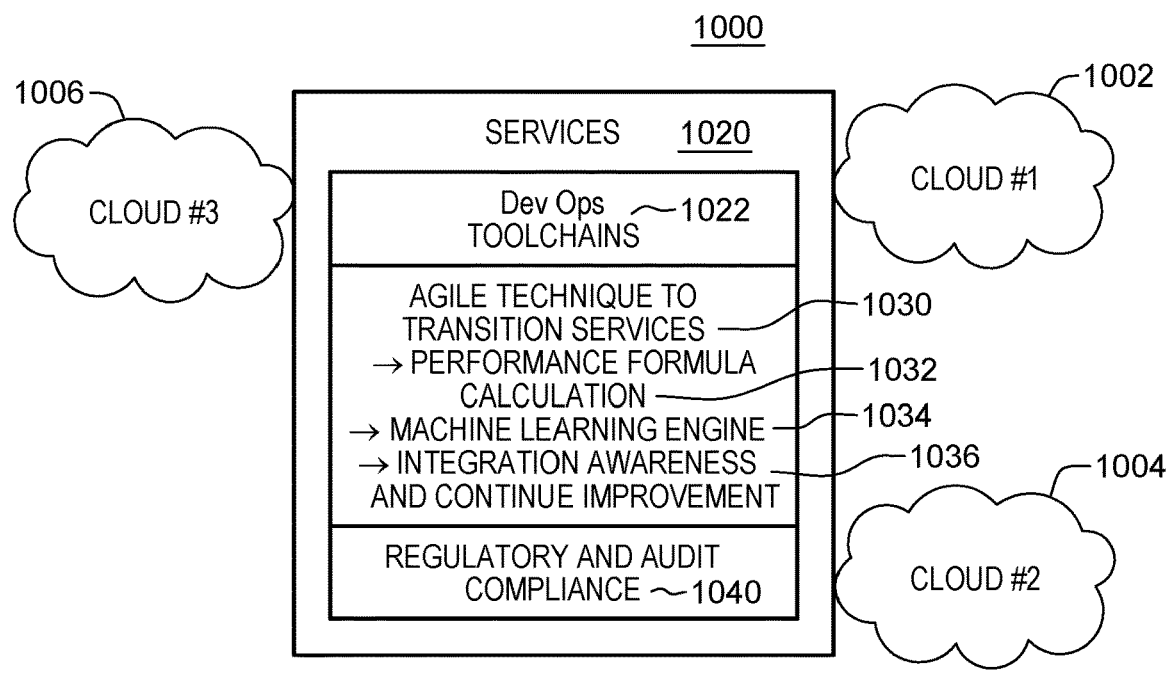
FIG. 10 depicts one example of a multi-cloud environment of a client to incorporate and/or use one or more aspects of the present invention.

In one aspect, a transitioning process to transition computer-related services from one entity (e.g., a client) to another entity (e.g., a service provider) is incorporated into a client's environment, such as a non-cloud environment or a cloud environment. One example of a client's multi-cloud environment is depicted in FIG. 10. As shown in FIG. 10, a multi-cloud environment 1000 includes a public cloud 1002, a public-private cloud 1004 and an on-premise cloud 1006. Further, in one aspect, multi-cloud environment 1000 includes one or more services 1020. One of the services are Dev Ops Toolchains 1022, which are sets or combinations of tools that aid in the delivery, development and management of software applications throughout the system's development life cycle, as managed by Dev Ops practices.

Generally, Dev Ops tools fit into one or more activities, which supports specific Dev Ops initiatives: Plan, Create, Verify, Package, Release, Configure and Monitor. In accordance with an aspect of the present invention, the process (e.g., agile technique) to transition computer-related services 1030 is integrated with the Dev Ops Toolchains to ensure services to be transitioned are managed accordingly and to be able to measure the outcome based on the performance formula calculation 1032 of an aspect of the invention.

The outcome is integrated, in one aspect, with a machine learning engine 1034 (e.g., machine learning engine 808) coded using, for instance, TensorFlow, to continue to perform machine learning from the constraints and to improve the transition process to achieve an improved outcome.

Further, in one aspect, integration awareness and continued improvement 1036 are integrated to ensure a seamless ability to transition services from various environments and to overcome different constraints. It also includes the introduction of new services, if desired.

In one aspect, regulatory and audit compliance 1040 are met within the existing and new operation environment.

As described herein, in one or more aspects, a transitioning process is provided that is used to transition computer-related services from one entity (e.g., a client) to another entity (e.g., a service provider). The transitioning process includes, at the very least, an automated process to integrate the computer-related services into the client's computing environment. The transitioning process, including the automated process, is generated by the service provider on behalf of the client to provide a process to integrate the computer-related services into the client's computing environment in an efficient and effective manner. In one example, the transitioning process is created based on an agile technique. The process detects changes, if any, for the new process and provides training and awareness briefing. Roll-outs, document changes and impacts are determined by reviewing the process and determining improvement achievements. Activities/tasks are logged into a machine learning engine to continually learn from changes/improvements to the process and/or environment. In one aspect, the process includes a flow to specifically determine the ways of defining a finalized outcome of the service with the use of a quality and quantitative formula calculation. One or more aspects allow continuing measurement of outcomes.

One or more aspects capture requirements for different sources and assess the performance outcome via an artificial intelligence engine (e.g., machine learning engine 808) leveraging on, e.g., TensorFlow, prior to finalizing the construct of a best approach of whether to integrate the services or introduce changes in an ever-changing computing environment.

One or more aspects of the present invention are inextricably tied to computing and improve processing within a computing environment. By transitioning computer-related services from one entity (e.g., a client) to another entity (e.g., a service provider), processing within the computing environment is improved. For instance, performance of the computing environment is improved, including performance in providing a computer-related service. One or more aspects are rooted in computer technology since the services being transitioned and integrated are computer-related services.

As indicated, one or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
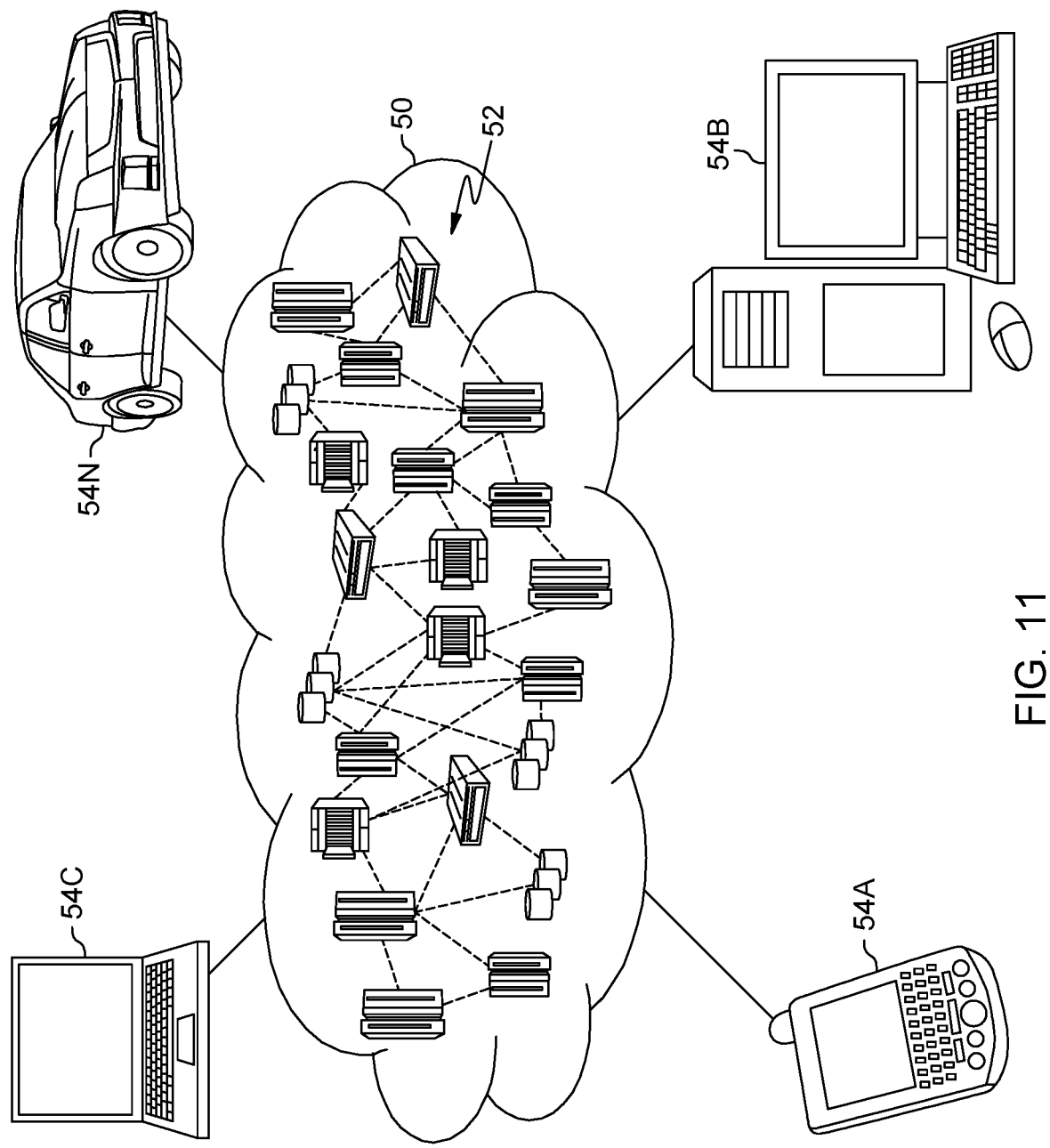
FIG. 11 depicts one embodiment of a cloud computing environment, in accordance with one or more aspects of the present invention.

Referring now to FIG. 11, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 52 and cloud computing environment 50 can communicate with any type of computerized device over any type of network and/or network addressable connection (e.g., using a web browser).

Figure 12:
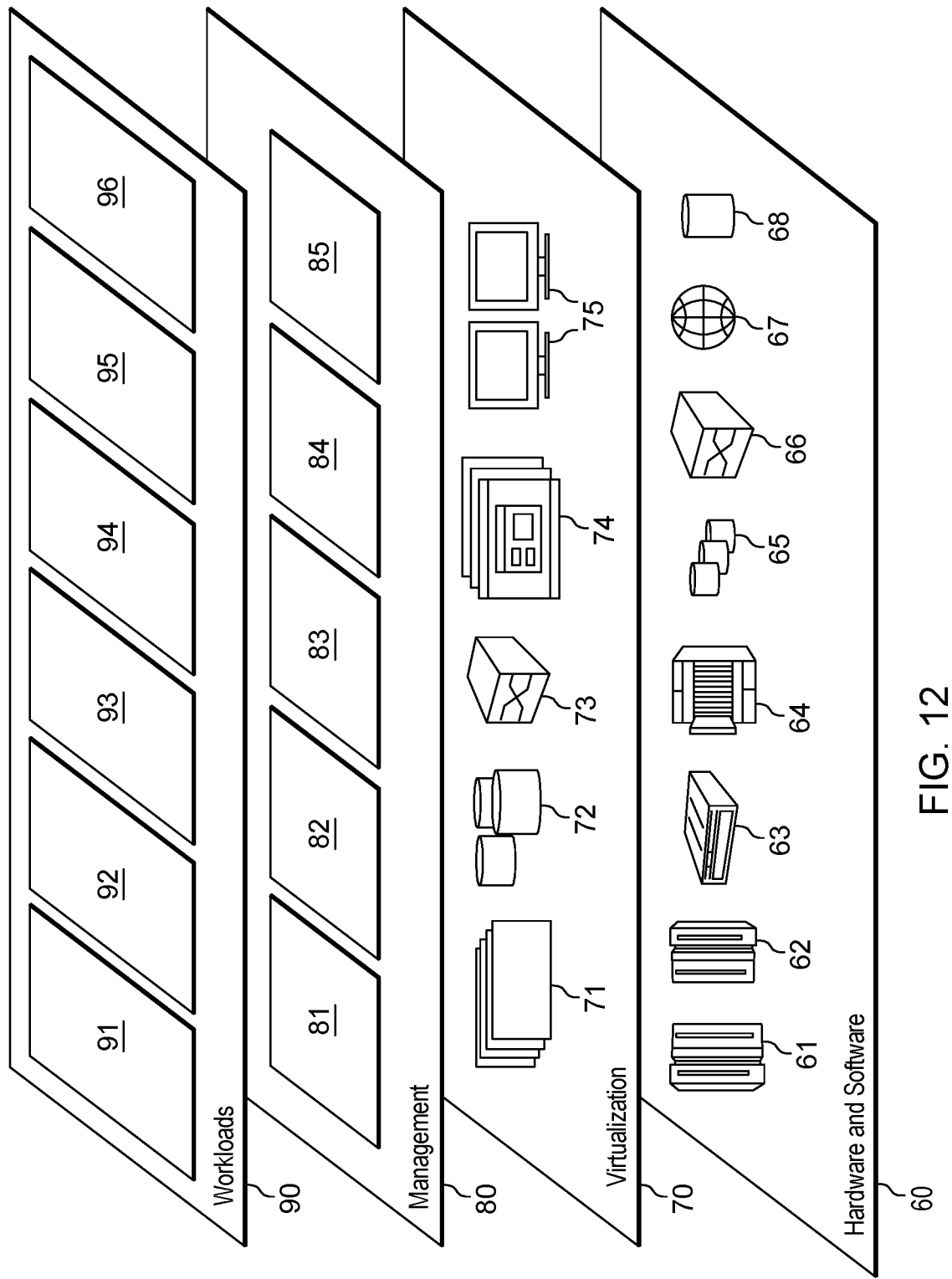
FIG. 12 depicts one example of abstraction model layers, in accordance with one or more aspects of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transitioning processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, in the examples and embodiments herein, one entity is the client and another entity is the service provider, but in other examples, other entities may benefit from one or more aspects of the present invention. Further, various services are provided as examples, but other computer-related services may be transitioned and integrated. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method to facilitate processing within a computing environment, the computer-implemented method comprising:

obtaining a transitioning process to be used to integrate a computer-related service with one or more other computer-related services of the computing environment, the computing environment being of a client and the transitioning process generated by a service provider on behalf of the client;

analyzing the computer-related service and the one or more other computer-related services to determine whether there is a conflict in integrating the computer-related service in the computing environment, wherein:
the analyzing comprises comparing one or more tasks of the transitioning process against one or more rules for integrating the computer-related service; and
the one or more rules for integrating the computer-related service comprise a business rule that an activity associated with the one or more tasks is to be able to satisfy a performance impact of the transitioning process generated by the service provider in terms of a target cost, a target timeline, and a target flow efficiency value associated with the performing of the computer-related service by the service provider on behalf of the client;

determining, based on at least the analyzing, whether one or more changes are to be made to a selected component to integrate the computer-related service in the computing environment, wherein at least the analyzing and the determining whether the one or more changes are to be made are part of an automated process generated to integrate the computer-related service, the automated process being at least a part of the transitioning process;

obtaining an indication of the performance impact of the transitioning process generated by the service provider to integrate the computer-related service in the computing environment of the client, wherein the indication of the performance impact comprises a flow efficiency value associated with performing the computer-related service by the service provider on behalf of the client and resulting from the transitioning process; and continuing with the transitioning process to integrate the computer-related service in the computing environment:

based on the performance impact meeting one or more selected criteria, including at least one criteria based on performance of the transitioning process, wherein the one or more selected criteria comprises the target flow efficiency value associated with the performing of the computer-related service by the service provider on behalf of the client, based on the business rule that the activity associated with the one or more tasks is to be able to satisfy the performance impact in terms of the target flow efficiency value, and based on determining that there are not the one or more changes to be made to the selected component, wherein the continuing with the transitioning process includes integrating the computer-related service in the computing environment, the computer-related service modifying the computing environment of the client.

2. The computer-implemented method of claim 1, further comprising performing the one or more changes prior to continuing with the transitioning process, based on determining that the one or more changes are to be made to the selected component.

3. The computer-implemented method of claim 1, further comprising providing data regarding the automated process to a machine learning engine, the machine learning engine to be used to determine the performance impact.

4. The computer-implemented method of claim 1, wherein the one or more selected criteria are provided in a rule, the rule included in annotation data accessible to the transitioning process.

5. The computer-implemented method of claim 1, wherein the analyzing uses annotation data, the annotation data comprising the one or more rules for integrating the computer-related service.

6. The computer-implemented method of claim 1, further comprising determining the performance impact, the determining the performance impact using an equation, the equation comprising:

[Value Added Activity Time/(Value Added Activity Time+Non-Value Added Activity Time)]*100%, where value added activity time is a time to perform the one or more tasks of the transitioning process and non-value added activity time is another time to perform one or more other tasks, the one or more other tasks including at least one waiting task.

7. The computer-implemented method of claim 6, wherein the equation provides a probability related to the performance impact, and wherein the computer-implemented method further comprises:

storing information relating to the transitioning process in a repository; and accessing the information by a machine learning engine to perform learning to improve the probability.

8. The computer-implemented method of claim 1, further comprising:

gathering data from one or more sources regarding the computing environment; and wherein the analyzing comprises reviewing the data with respect to the computer-related service to determine whether the integrating is to continue.

9. The computer-implemented method of claim 1, wherein the at least one criteria includes comparing the performance impact of the transitioning process generated by the service provider to the performance of the transitioning process.

10. The computer-implemented method of claim 1, wherein the transitioning process is generated based on an agile technique.

11. A computer system for facilitating processing within a computing environment, the computer system comprising:

a memory; and a processor in communication with the memory, wherein the computer system is configured to perform a method, said method comprising:

obtaining a transitioning process to be used to integrate a computer-related service with one or more other computer-related services of the computing environment, the computing environment being of a client and the transitioning process generated by a service provider on behalf of the client;

analyzing the computer-related service and the one or more other computer-related services to determine whether there is a conflict in integrating the computer-related service in the computing environment, wherein:

the analyzing comprises comparing one or more tasks of the transitioning process against one or more rules for integrating the computer-related service; and the one or more rules for integrating the computer-related service comprise a business rule that an activity associated with the one or more tasks is to be able to satisfy a performance impact of the transitioning process generated by the service provider in terms of a target cost, a target timeline, and a target flow efficiency value associated with the performing of the computer-related service by the service provider on behalf of the client;

determining, based on at least the analyzing, whether one or more changes are to be made to a selected component to integrate the computer-related service in the computing environment, wherein at least the analyzing and the determining whether the one or more changes are to be made are part of an automated process generated to integrate the computer-related service, the automated process being at least a part of the transitioning process;

obtaining an indication of the performance impact of the transitioning process generated by the service provider to integrate the computer-related service in the computing environment of the client, wherein the indication of the performance impact comprises a flow efficiency value associated with performing the computer-related service by the service provider on behalf of the client and resulting from the transitioning process; and continuing with the transitioning process to integrate the computer-related service in the computing environment:

based on the performance impact meeting one or more selected criteria, including at least one criteria based on performance of the transitioning process, wherein the one or more selected criteria comprises the target flow efficiency value associated with the performing of the computer-related service by the service provider on behalf of the client, based on the business rule that the activity associated with the one or more tasks is to be able to satisfy the performance impact in terms of the target flow efficiency value, and based on determining that there are not the one or more changes to be made to the selected component, wherein the continuing with the transitioning process includes integrating the computer-related service in the computing environment, the computer-related service modifying the computing environment of the client.

12. The computer system of claim 11, wherein the method further comprises providing data regarding the automated process to a machine learning engine, the machine learning engine to be used to determine the performance impact.

13. The computer system of claim 11, wherein the method further comprises determining the performance impact, the determining the performance impact using an equation, the equation comprising:

[Value Added Activity Time/(Value Added Activity Time+Non-Value Added Activity Time)]*100%, where value added activity time is a time to perform the one or more tasks of the transitioning process and non-value added activity time is another time to perform one or more other tasks, the one or more other tasks including at least one waiting task.

14. The computer system of claim 13, wherein the equation provides a probability related to the performance impact, and wherein the method further comprises:

storing information relating to the transitioning process in a repository; and accessing the information by a machine learning engine to perform learning to improve the probability.

15. The computer system of claim 11, wherein the method further comprises:

gathering data from one or more sources regarding the computing environment; and wherein the analyzing comprises reviewing the data with respect to the computer-related service to determine whether the integrating is to continue.

16. A computer program product for facilitating processing within a computing environment, the computer program product comprising:

one or more computer readable storage media and program instructions collectively stored on the one or more computer readable storage media to perform a method comprising:

obtaining a transitioning process to be used to integrate a computer-related service with one or more other computer-related services of the computing environment, the computing environment being of a client and the transitioning process generated by a service provider on behalf of the client;

analyzing the computer-related service and the one or more other computer-related services to determine whether there is a conflict in integrating the computer-related service in the computing environment, wherein:

the analyzing comprises comparing one or more tasks of the transitioning process against one or more rules for integrating the computer-related service; and the one or more rules for integrating the computer-related service comprise a business rule that an activity associated with the one or more tasks is to be able to satisfy a performance impact of the transitioning process generated by the service provider in terms of a target cost, a target timeline, and a target flow efficiency value associated with the performing of the computer-related service by the service provider on behalf of the client;

determining, based on at least the analyzing, whether one or more changes are to be made to a selected component to integrate the computer-related service in the computing environment, wherein at least the analyzing and the determining whether the one or more changes are to be made are part of an automated process generated to integrate the computer-related service, the automated process being at least a part of the transitioning process;

obtaining an indication of the performance impact of the transitioning process generated by the service provider to integrate the computer-related service in the computing environment of the client, wherein the indication of the performance impact comprises a flow efficiency value associated with performing the computer-related service by the service provider on behalf of the client and resulting from the transitioning process; and continuing with the transitioning process to integrate the computer-related service in the computing environment:

based on the performance impact meeting one or more selected criteria, including at least one criteria based on performance of the transitioning process, wherein the one or more selected criteria comprises the target flow efficiency value associated with the performing of the computer-related service by the service provider on behalf of the client, based on the business rule that the activity associated with the one or more tasks is to be able to satisfy the performance impact in terms of the target flow efficiency value, and based on determining that there are not the one or more changes to be made to the selected component, wherein the continuing with the transitioning process includes integrating the computer-related service in the computing environment, the computer-related service modifying the computing environment of the client.

17. The computer program product of claim 16, wherein the method further comprises providing data regarding the automated process to a machine learning engine, the machine learning engine to be used to determine the performance impact.

18. The computer program product of claim 16, wherein the method further comprises determining the performance impact, the determining the performance impact using an equation, the equation comprising:

[Value Added Activity Time/(Value Added Activity Time+Non-Value Added Activity Time)]*100%, where value added activity time is a time to perform the one or more tasks of the transitioning process and non-value added activity time is another time to perform one or more other tasks, the one or more other tasks including at least one waiting task.

19. The computer program product of claim 18, wherein the equation provides a probability related to the performance impact, and wherein the method further comprises:
   storing information relating to the transitioning process in a repository; and
   accessing the information by a machine learning engine to perform learning to improve the probability.

20. The computer program product of claim 16, wherein the method further comprises:
   gathering data from one or more sources regarding the computing environment; and
   wherein the analyzing comprises reviewing the data with respect to the computer-related service to determine whether the integrating is to continue.

* * * * *